United States Patent [19]
Dwyer, III et al.

[11] Patent Number: 5,727,167
[45] Date of Patent: Mar. 10, 1998

[54] THRESHOLDING SUPPORT IN PERFORMANCE MONITORING

[75] Inventors: Harry Dwyer, III, Annandale, N.J.; Frank Eliot Levine; Edward Hugh Welbon, both of Austin, Tex.; Charles Gordon Wright, Round Rock, Tex.

[73] Assignee: International Business Machines Corporation, Armonk, N.Y.

[21] Appl. No.: 654,068

[22] Filed: Jun. 11, 1996

Related U.S. Application Data

[63] Continuation of Ser. No. 422,363, Apr. 14, 1995, abandoned.

[51] Int. Cl.⁶ .......................................... G06F 13/00
[52] U.S. Cl. ..................... 395/280; 395/444; 395/490
[58] Field of Search ............................ 395/280, 444, 395/490, 440

[56] References Cited

U.S. PATENT DOCUMENTS

| | | | |
|---|---|---|---|
| 3,906,454 | 9/1975 | Martin | 395/183.21 |
| 4,034,353 | 7/1977 | Denny et al. | 395/140 |
| 4,438,490 | 3/1984 | Wilder, Jr. | 395/184.01 |
| 4,459,656 | 7/1984 | Wilder, Jr. | 395/550 |
| 4,636,967 | 1/1987 | Bhatt et al. | 364/557 |
| 4,811,347 | 3/1989 | Bolt | 371/51 |
| 4,821,178 | 4/1989 | Levin et al. | 395/184.01 |
| 4,849,879 | 7/1989 | Chinnaswanny et al. | 395/60 |
| 4,905,171 | 2/1990 | Kiel et al. | 395/184.01 |
| 4,969,088 | 11/1990 | McAuliffe et al. | 395/425 |
| 5,038,278 | 8/1991 | Steely, Jr. et al. | 395/460 |
| 5,043,885 | 8/1991 | Robinson | 395/460 |
| 5,062,055 | 10/1991 | Chinnaswanny et al. | 395/551.01 |
| 5,074,144 | 12/1991 | Krofchalk et al. | 73/117.3 |
| 5,088,058 | 2/1992 | Salsburg | 395/500 |
| 5,097,412 | 3/1992 | Orimo et al. | 395/500.01 |
| 5,103,394 | 4/1992 | Blasciak | 395/184.01 |
| 5,142,670 | 8/1992 | Stone et al. | 395/440 |
| 5,151,981 | 9/1992 | Westcott et al. | 395/375 |
| 5,151,982 | 9/1992 | Suzuki et al. | 395/425 |
| 5,168,563 | 12/1992 | Shenoy et al. | 395/500 |
| 5,193,179 | 3/1993 | Laprade et al. | 395/575 |
| 5,223,827 | 6/1993 | Bell et al. | 340/825.06 |
| 5,388,242 | 2/1995 | Jewett | 395/440 |
| 5,423,020 | 6/1995 | Vojnovich | 395/842 |
| 5,426,741 | 6/1995 | Butts, Jr. et al. | 395/325 |
| 5,488,377 | 1/1996 | Reynolds, III et al. | 342/93 |

*Primary Examiner*—Ayaz R. Sheikh
*Attorney, Agent, or Firm*—Whitham, Curtis, Whitham & McGinn; Anthony V. England, Jr.

[57] ABSTRACT

A thresholding mechanism and method for performance monitoring of memory array access distribution times is disclosed. A data request signal sent to the memory hierarchy activates a first counter, having a first count value. A clock coupled to the first counter increments the first count value with each clock cycle, while also decrementing a decrementer having a predetermined threshold value. The first counter is deactivated by a completion signal when the data request is completed. A second counter having a second count value is incremented when the first count value is greater than the threshold value by the time the data request is complete.

10 Claims, 6 Drawing Sheets

| bits 0-4 counting enables | bit 5 interrupt enable | bits 6-15 | bit 16 PMC1 interrupt control | bit 17 PMC2 interrupt control | bit 18 PMC2 count control | bits 19-25 PMC1 event selection | bits 26-31 PMC2 event selection |
|---|---|---|---|---|---|---|---|

Monitor Mode Control Register 0 (MMCR0)

FIG.4

THRESHOLDING SUPPORT IN PERFORMANCE MONITORING

This application is a continuation of application Ser. No. 08/422,363 filed on Apr. 14, 1995 now abandoned.

BACKGROUND OF THE INVENTION

1. Field of the Invention

The present invention generally relates to performance monitoring in a data processing system, and, more particularly, to an efficient architected mechanism that analyzes memory hierarchy performance only if a memory cache event exceeds a variable user-specified amount of time.

2. Description of the Prior Art

A performance monitor is a facility incorporated into a processor to monitor selected characteristics to help system developers to debug and analyze their systems by determining the state of the machine at a specific point in time.

Performance monitors produce information relating to the utilization of the processor's instruction execution and storage control functions; information that is of value to computer architects seeking to enhance the performance of an existing processor or develop data for the design of a new processor.

The optimization of software for execution on complex uniprocessors or multiprocessors involves the study of a program's memory access patterns and their interaction with a system's memory hierarchy. The memory hierarchy behavior must be understood in order to develop algorithms that schedule tasks (and perhaps partition them), and structure and distribute data optimally.

Currently there are two approaches to the acquisition of information about a system's memory hierarchy behavior while running an application; utilizing test instruments or incorporating software-accessible counters into a processor chip.

Utilizing the first approach, test instruments are attached to various test points in a processing system to monitor signals. However, there are several drawbacks to this approach. One is that it is difficult to associate a particular instruction with an activity observed on a bus external to a complex processor. Complex pipelines, instruction prefetching, and data buffering make it difficult to associate events external to a processor with an internal processor state.

Also, it is difficult to find appropriate test points and to attach instrumentation to them. The most significant drawback to this approach, however, is that advanced processors may incorporate one or more levels of cache (L1, L2, etc.) and memory hierarchy wholly within the processor chip. Access to these levels with test instruments is therefore not possible. In sum, this approach provides limited information with significant difficulty.

In an effort to resolve some of the problems with the first approach, designers have taken to incorporating software-accessible counters into the processor chip. These counters simply count the number of L1 and L2 cache hits/misses. A limitation of this approach is that the granularity of the information provided is large. In other words, a cache access may not take the same number of machine cycles each time it occurs, these access times in an advanced processor may vary over a wide range of values depending on other cache or processor activity.

In this second approach, a simple count of L1 or L2 hits from the software counter, producing such representative data as shown in FIG. 1 for example, does not reveal the shape of the access time distribution curve associated with L1 and L2 cache accesses. An access time distribution curve is a graph showing the number of occurrences of a certain event as a function of the access time in cycles. The distribution of access times experienced by an application to various levels of memory hierarchy, which is essential to optimizing software, is thus lost with the above approach.

In light of the foregoing, there exists a need for a mechanism and method to identify the distribution of access times for all levels of memory hierarchy.

SUMMARY OF THE INVENTION

The present invention is directed to an apparatus and method for providing detailed information on the distribution of access times while accessing all levels of a system's memory hierarchy during an application's execution, which substantially obviates one or more of the problems due to the limitations and disadvantages of the related art.

In general, a processor is able to associate the data returned from a memory hierarchy access with a particular load instruction or request. A processor must have this capability to forward the data to the appropriate destinations and to determine that the load instruction is completed.

The present invention uses this capability to start a counter (subsequently incremented by a processor or bus clock) when a particular load request is issued to the memory hierarchy. The count is halted when the data associated with the particular request is available. The counter now contains the access time in machine cycles for the selected access. If this access time exceeds a value that has been loaded into a special register, a second counter is incremented.

By accumulating counts of accesses that exceed decreasing threshold values, a histogram can be generated that reveals the access time distribution of memory requests. This distribution reflects the proportionate numbers of "hits" at all memory levels (e.g., L1, L2, and main memory) and will also reflect so-called smearing effects caused by unanticipated contention for buses or other system resources. These conflicts can cause the access time to a given memory level (e.g., L2) to vary over a range of values. This detailed distribution reveals system effects and access time information that are not captured with the prior art approaches.

To achieve these and other advantages and in accordance with the purpose of the invention, as embodied and broadly described, the invention provides for a thresholding mechanism for a performance monitoring system comprising a memory hierarchy for processing a data request signal; a first counter having a first count value that is activated by the data request signal and deactivated by a data completion signal; a timing means coupled to the first counter, the timing means incrementing the first count value with each clock cycle after the first counter is activated; a decrementer responsive to the timing means, the decrementer having a threshold value that is decremented with each clock cycle; and a second counter having a second count value that is incremented when the first count value is greater than the threshold value when the data completion signal is received.

In another aspect, the invention provides for a method of determining memory accesses as a function of elapsed clock cycles, the method comprising the steps of receiving a data request signal in a memory hierarchy; activating a first count value of a first counter upon receiving the data request signal; incrementing the first count value with each clock cycle; decrementing a threshold value of a decrementer with each clock cycle; deactivating the incrementing step when a data completion signal is received; comparing the first count value to the threshold value; and incrementing a second count value when the first count value is greater than the threshold value.

It is to be understood that both the foregoing general description and the following detailed description are exemplary and explanatory and are intended to provide further explanation of the invention as claimed.

BRIEF DESCRIPTION OF THE DRAWINGS

The foregoing and other objects, aspects and advantages will be better understood from the following detailed description of a preferred embodiment of the invention with reference to the drawings, in which:

FIG. 4 illustrates a monitor mode control register (MMCR) utilized to manage a plurality of counters;

DETAILED DESCRIPTION OF A PREFERRED EMBODIMENT OF THE INVENTION

Figure 1:
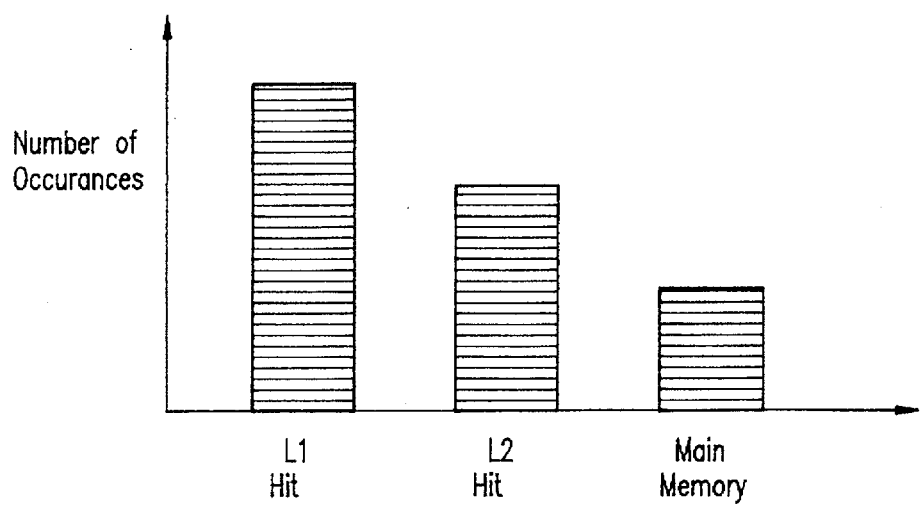
FIG. 1 is a bar graph of the number of L1, L2, and main memory hits gathered by a related art software-accessible counter incorporated into a processor chip.
Figure 2:
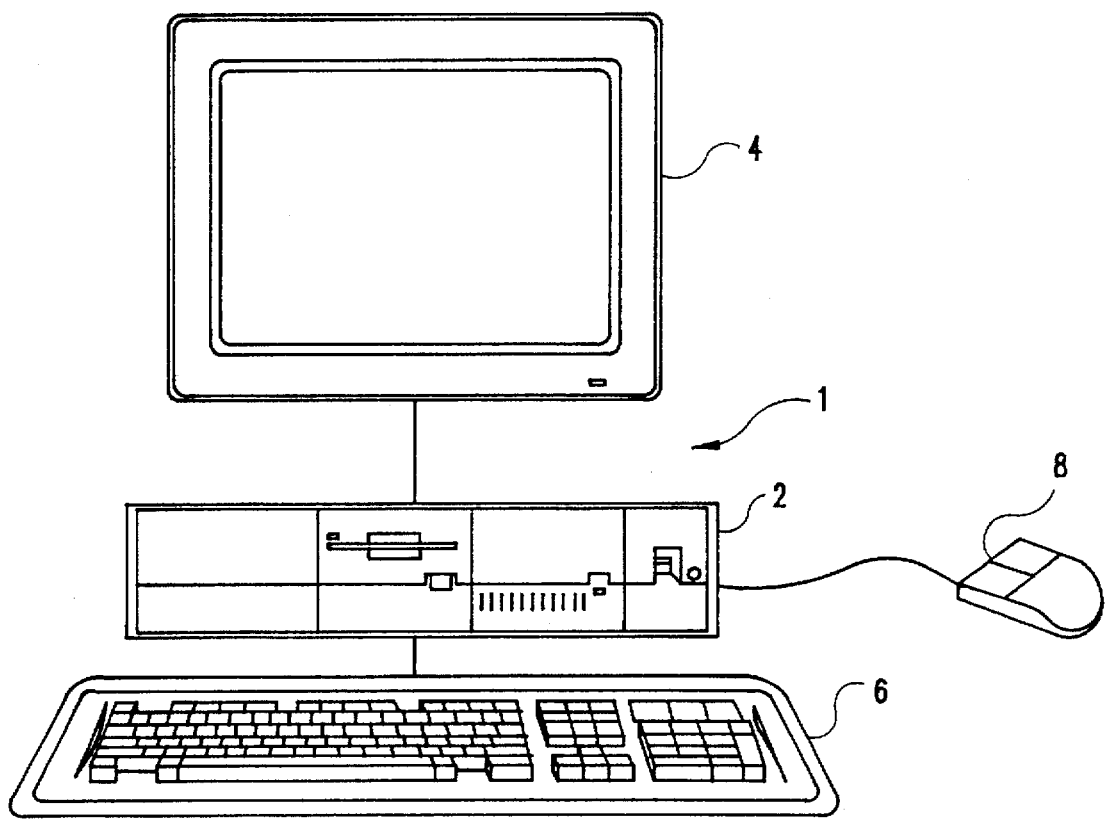
FIG. 2 is a data processing system utilizing the method and system of the present invention.

Referring now to the drawings, and more particularly to FIG. 2, there is shown a data processing system employing the method and system of the present invention. As shown, the data processing system 1 may include one or more of a processing unit 2, display device 4, keyboard 6, and mouse 8, and various other components both integral and peripheral. As is well-known in the art, a user may input data to data processing system 1 utilizing keyboard 6 or mouse 8. Data processing system 1 outputs data to a user via display device 4. The processing unit 2 includes means for interfacing display device 4, keyboard 6, and mouse 8, to a central processor, such as for example, a PowerPC microprocessor (PowerPC is a trademark of IBM Corporation).

Figure 3:
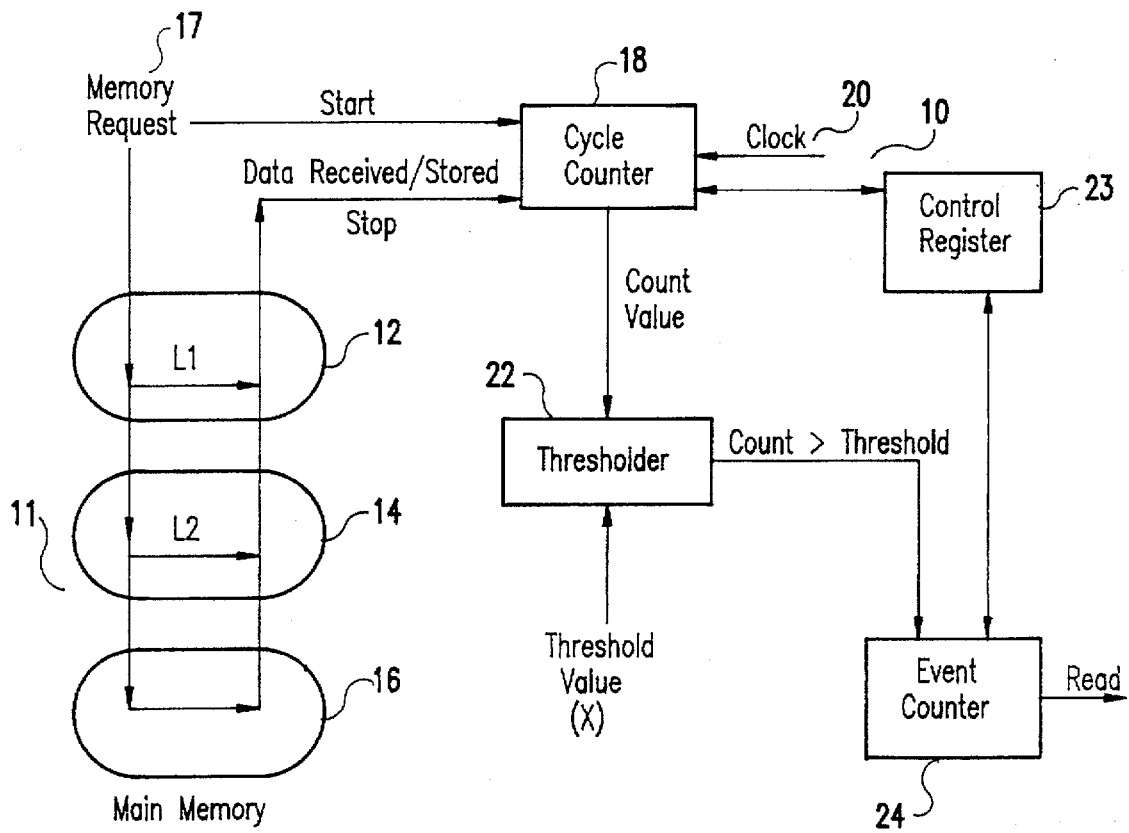
FIG. 3 is a block diagram of a threshold mechanism for load or store instructions.

Referring to FIG. 3, there is depicted a block diagram of a thresholding mechanism for a performance monitor, designated generally as 10, for use by a data processing system such as that depicted in FIG. 2. The thresholding mechanism includes a memory hierarchy 11, and is shown to include, by way of example and not by limitation, an L1 cache 12, an L2 cache 14, and a main memory 16. It is understood that any number or combination of cache levels and main memory are considered within the scope of the term memory hierarchy.

In operation, a processor must be able to associate or tag data returned from a memory hierarchy access with a particular load instruction or request in order to forward the data to the appropriate destination and determine that the load instruction is completed.

Using this capability, when a memory request or data request signal 17 is issued to the memory hierarchy 11, the signal activates a counter 18 that is subsequently incremented, with each clock cycle, by a clock 20. The memory request 17 may either be a data load instruction or a data store instruction.

The clock 20 may be a conventional processor clock. Alternatively, a bus clock may be utilized instead of the processor clock as a base for the thresholding and counting functions. Bus clocks are often more difficult to support in the hardware due to synchronization problems, but better for software granularity. In another alternative, the thresholding count could represent an integral number of processor clock cycles.

At the same time that the cycle counter 18 is activated, a decrementer or thresholder 22 is initialized with a threshold value (X) that is variable and software setable. The purpose of incorporating a threshold value (X) is to be able to characterize certain data cache misses, for example, L1 or L2 data cache misses. Specifically, the system should be able to identify (via repeated runs and sampling) the time distribution required to satisfy L1 or L2 cache misses. By accumulating counts of accesses that exceed decreasing threshold values, designers would have a clearer picture of conflicts that cause the access time to a given memory level to vary over a range of values.

The software threshold initialization is accomplished using an implementation dependent number (2–4) of counters (i.e., $PMC_1$, $PMC_2$, $PMC_3$, $PMC_4$) that are used to count processor/storage related events. Monitor Mode Control Registers (MMCR) establish the function of the bit counters $PMC_n$, with each MMCR controlling two bit counters. The counters and control registers reside on the processor chip and are accessible for read or write via mfspr (moved from special purpose register) or mtspr (moved to special purpose register) instructions.

The interaction and operation of the control registers and counters in a multi-microprocessor system are discussed in U.S. patent application, Ser. No. 08/353,006, filed Dec. 9, 1994 which is now U.S. Pat. No. 5,544,527, by Frank C. Gover et al, the disclosure of which is hereby incorporated by reference. Portions are reproduced in appropriate sections below for ease of discussion and reference.

In the disclosed embodiment, there are two 32-bit counters $PMC_1$ (cycle counter 18), $PMC_2$ (event counter 24), controlled by a 32-bit control register 23 (MMCR0) whose bits are partitioned into bit fields that allow for selection of events (signals) to be recorded (counted). Selection of allowable combinations of events causes the counters to operate concurrently. Smaller or larger bit counters and registers may be utilized to correspond to a particular processor and bus architecture, and design considerations such as the desired functionality of the performance monitor and the chip area within a processor. It is apparent that depending on the intended application, additional MMCR's and PMC's may be utilized and are considered to be within the scope of this invention.

With reference to FIG. 4, there is illustrated a representation of MMCR0 which controls the operation of counters $PMC_1$ and $PMC_2$. As illustrated, for example, MMCR0 is partitioned into a number of bit fields whose settings select events to be counted, enable performance monitor interrupts, specify the conditions under which counting is enabled, and set the threshold value (X).

In the illustrated example, bits 0–4 and 18 determine the scenarios under which $PMC_1$ and $PMC_2$ are enabled to count. Bits 5, 16, and 17 are utilized to control interrupt signals triggered by $PMC_1$ and $PMC_2$. Bits 19–25 and 26–31 are utilized to select the events monitored by $PMC_1$ and $PMC_2$ respectively. Bits 6-9 are utilized to control the time or event based transitions. Finally, the threshold value is variably set by bits 10-15.

It is apparent that depending on the particular features sought to be profiled, many different event counting and sampling scenarios may be utilized with the scope of this invention. One method of implementation, for example, would be to have the threshold value (X) represent the number of cycles for the item being counted in the first counter $PMC_1$ to be executed and to accumulate values in the $PMC_2$ counter only when the count exceeds the threshold value (X). For example, if the item being counted in $PMC_1$ was data cache miss cycles, and the threshold value (X) was set to 5, then only L1 cache miss cycles that took greater than 5 cycles would be counted in $PMC_2$. The second bit counter $PMC_2$ could be used to count total number of cycles or time.

Referring again to embodiment of FIG. 3, after the threshold value is initialized, the decrementer/thresholder 22 is decremented by one with each clock cycle. The threshold value (X) is said to be exceeded when the decrementer reaches zero before the data instruction completes. It is not exceeded if the data request sequence is completed before the decrementer reaches zero. The term "completed" has a different meaning depending on the type of data instruction. For the lead instructions, "complete" indicates that the data associated with the same request was "received"; for the store instructions, "complete" indicates that the data was written or "stored" to the cache. A second counter $PMC_2$, i.e. event counter 24, is incremented every time the threshold value (X) is exceeded.

Figure 5:
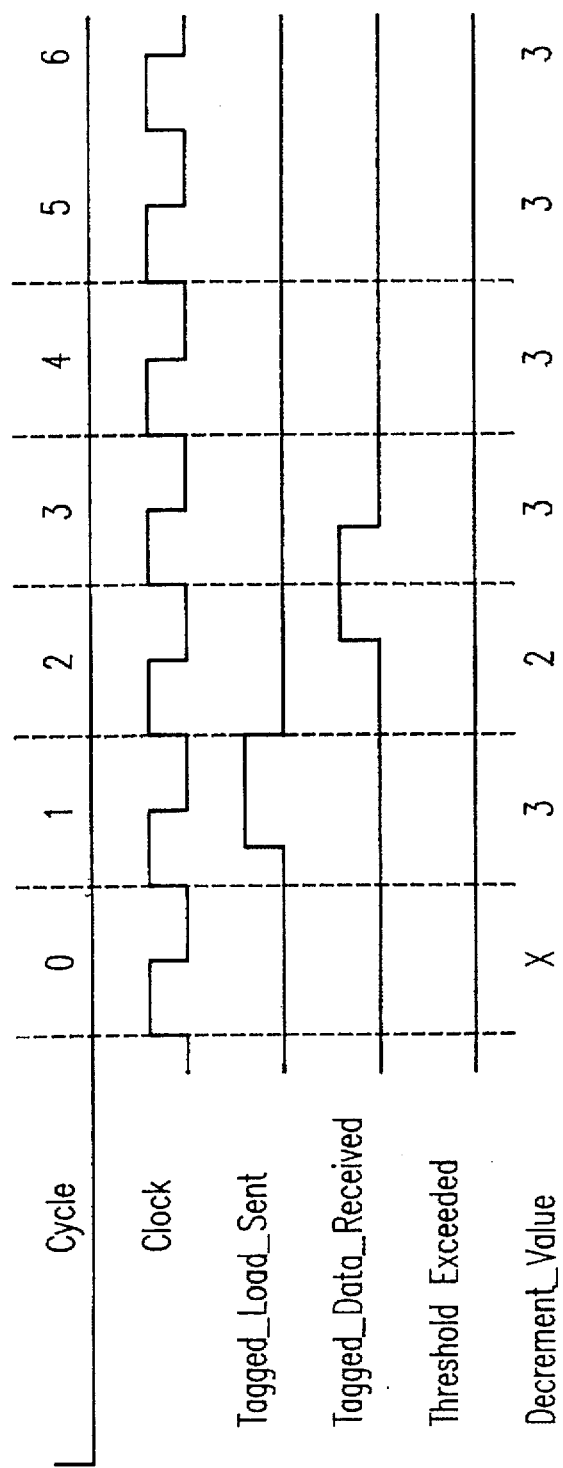
FIG. 5 is a sample timing diagram of the thresholding mechanism where the threshold is not exceeded.

FIG. 5 illustrates a sample timing diagram of the thresholding mechanism where the threshold is not exceeded. In this case the threshold value of (X) has been set to 3 clock cycles. When the tagged lead instruction is sent, cycle counter 18 is incremented by one with each clock cycle. At the same time, the threshold decrementer begins decrementing by one from its threshold value (X) with each clock cycle. As shown in FIG. 5, since the tagged data is received after one clock cycle, the count value in cycle counter 18 is one and the decrementer 22 threshold value is two. Since the threshold has not been exceeded—the data was received before the decrementer reached zero—the count value is less than the decrementer (threshold) value and thus the event counter 24 would not be incremented.

Figure 6:
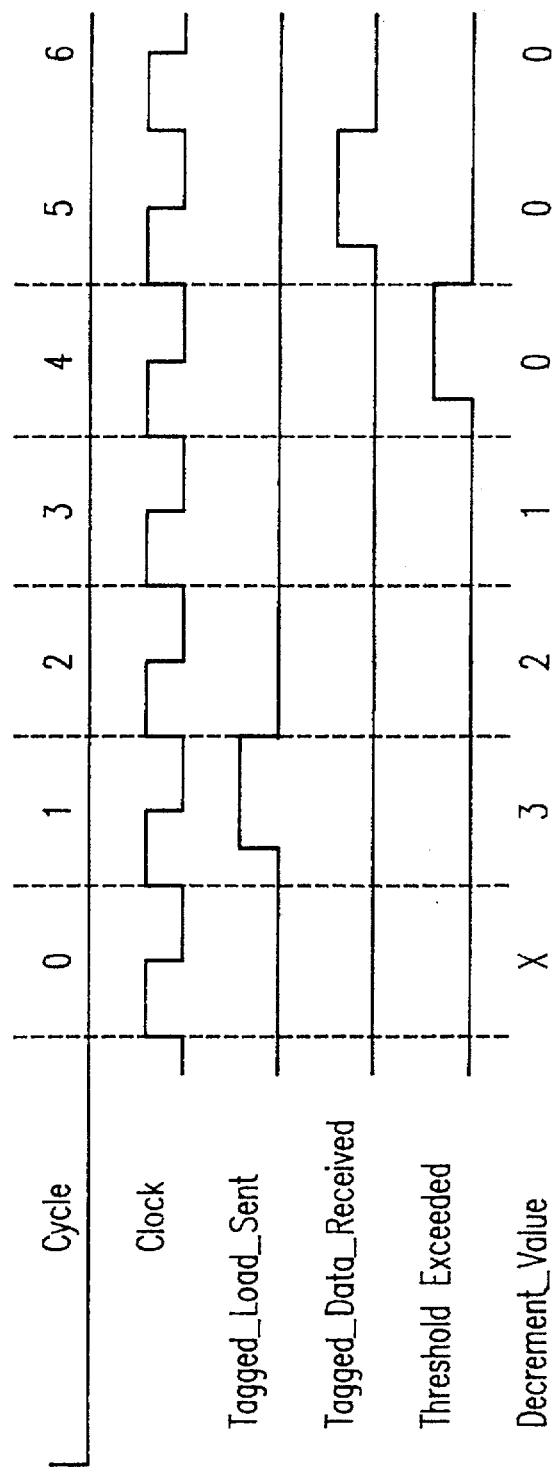
FIG. 6 is a sample timing diagram of the thresholding mechanism where the threshold is exceeded.

The opposite condition, that is where the threshold value is exceeded, is shown in the sample timing diagram in FIG. 6. As before, the threshold value of (X) has been set to 3 clock cycles. When the tagged lead instruction is sent, cycle counter 18 is again incremented by one with each clock cycle. At the same time, the threshold decrementer begins decrementing by one from its threshold value (X) with each clock cycle. Since the tagged data was received four clock cycles after activation (cycle 5), the count value is four. Since the decrementer 22 threshold value had already reached zero by cycle 4, the threshold was exceeded. In this case the count value exceeded the threshold value and thus the event counter 24 is incremented by one.

Figure 7:
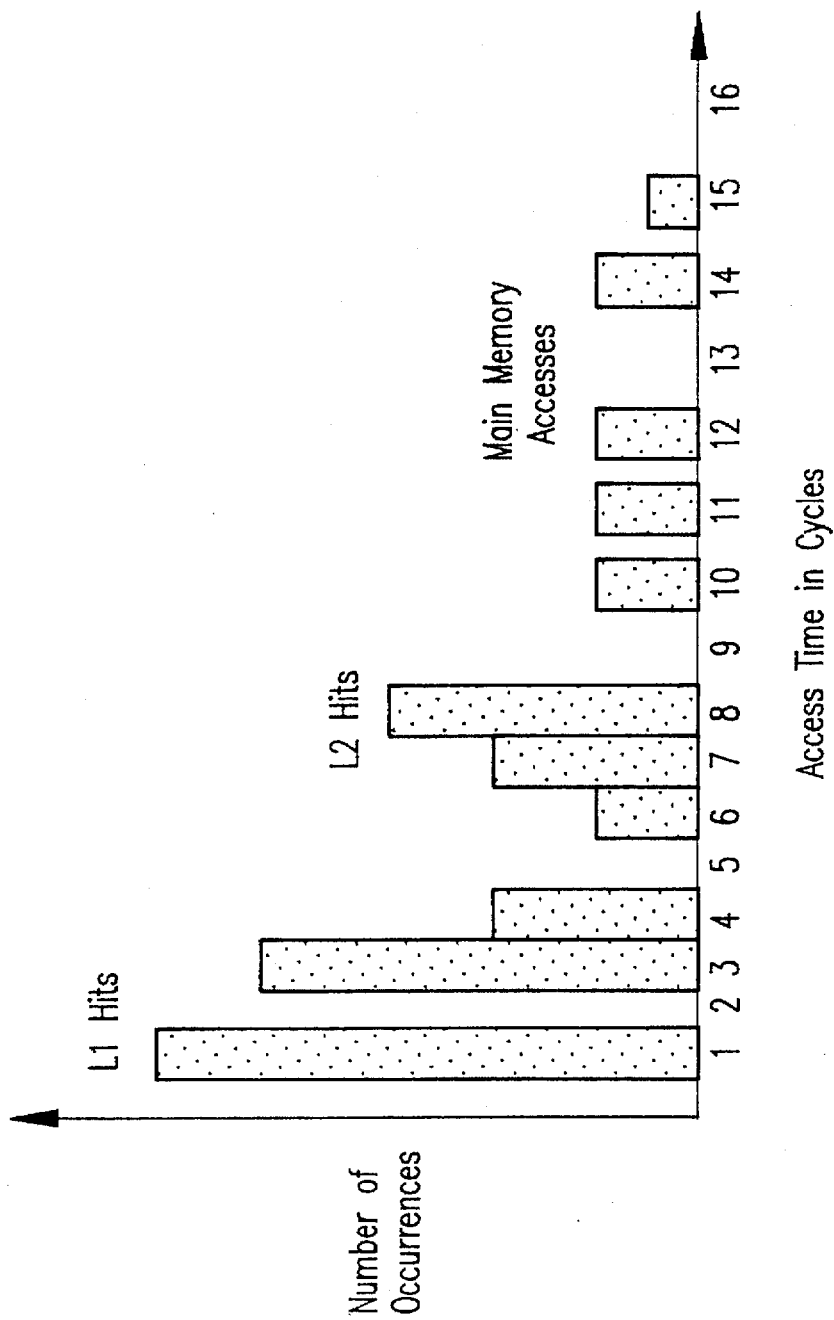
FIG. 7 is a graph providing an illustrative access time distribution curve produced in accordance with the present invention.

Through repeated rims with different threshold values, processor system developers can accumulate counts of accesses whose timings exceed decreasing threshold values, thereby generating a cache hit distribution chart, or histogram, as shown in FIG. 7, which reflects the proportionate number of "hits" at the various memory levels. In analyzing the example data in FIG. 7, it can be seen that main memory access times vary over a wide range—perhaps due to interleaved memory bank conflicts or system bus conflicts. In this case the processor designer would conduct further analysis to determine the exact cause of the wide distribution of access times, and hopefully, design around it. The distribution of L1 and L2 access times reveals how well their structures support the application on which the example data is based.

Rather than causing a performance interrupt at each instance where the threshold value is exceeded, the counters may be programmed to overflow, for example, by setting initial values for the counters to cause an interrupt to be triggered on the 100th data cache miss that exceeds the specified threshold value. In this way, samples are taken only of those items that are counted.

In multiple processor hardware systems such as PowerPC processors, where cache coherency is supported, one can identify when hits are occurring in other processor caches. For example, counts can be made of L2 lateral cache hits in another processor's L2 cache. This information can be profiled by programming the counters to give interrupts when these conditions occur. L2 cache hits in other caches are very expensive time-wise, and by identifying these "hot spots", there is an opportunity to modify the code to avoid this condition.

The interaction and operation of the performance monitor interrupt with interrupt masking for a multiprocessor system (MP) are discussed in U.S. patent application, Ser. No. 08/358,220, (Attorney Docket No. AT9-94-181) filed Dec. 16, 1994 by R. L. Arndt et al, the disclosure of which is hereby incorporated by reference.

In operation, the performance monitor interrupt for each processor in a multiprocessor system contains a series of associated special purpose registers (SPR). To ensure that there is no loss of data due to interrupt masking, when the interrupt condition is detected (via either a time base transition or a counter overflow), the processors will capture the effective instruction and operand (if any) addresses of an instruction in execution and present an interrupt to the interrupt resolution logic. The instruction and operand addresses are saved in two SPRs, a Saved Instruction Address (SIA) and Saved Data Address (SDA), respectively, designated for this purpose at the time of the system wide interrupt signalling. When the interrupt is actually serviced, the content of the SDA and SIA will reflect the processor state at the time of the system wide signalling. The monitoring facility also captures the state, or count values, of the counters, $PMC_1$ and $PMC_2$. The resulting information can be utilized by designers to optimize system performance.

While the invention has been described in terms of the embodiments described above, those skilled in the art will recognize that the invention can be practiced with modification within the spirit and scope of the appended claims.

Having thus described the invention, what is claimed as new and desire to secure by Letters Patent is as follows:

1. A thresholding mechanism for a performance monitor system in a data processing system comprising:

a memory hierarchy including at least one level of cache memory and a main memory for processing a memory request signal and outputting a data completion signal when a memory request signal has been processed;

a cycle counter activated by the memory request signal to said memory hierarchy and deactivated by the data completion signal from said memory hierarchy;

a clock coupled to the cycle counter, said clock incrementing the cycle counter with each clock cycle after the cycle counter is activated;

a monitor mode control register storing a threshold value, the threshold value being variable and software settable;

a thresholder connected to said cycle counter to receive an output count value when the cycle counter is deactivated by a data completion signal, said thresholder comparing the threshold value stored in said monitor mode control register with the output count value from the cycle counter, said thresholder generating an output when the count value exceeds the threshold value;

an event counter incremented by the output from said thresholder; and output means connected to said event counter for generating an output for performance analysis, said output means accumulating counts of memory accesses for said at least one level of cache and said main memory that exceed decreasing threshold values set in said monitor mode control register and generating a histogram of access time distributions of memory requests for each of said one level of cache and said main memory.

2. The thresholding mechanism for a performance monitor system recited in claim 1, wherein the memory request signal is selected from the group consisting of a data load instruction and a data store instruction.

3. The thresholding mechanism for a performance monitor system recited in claim 1, wherein the cycle and event counters are 32-bit software implemented counters.

4. The thresholding mechanism for a performance monitor system recited in claim 1, wherein the clock comprises a processor clock.

5. The thresholding mechanism for a performance monitor system recited in claim 1, wherein the clock comprises a bus clock.

6. A method of determining a memory access distribution as a function of elapsed clock cycles, the method comprising the steps of:

receiving a memory request signal in a memory hierarchy including at least one level of cache memory and a main memory;

generating a data completion signal when a memory request signal has been processed by said memory hierarchy;

activating a cycle counter upon receiving the memory request signal;

incrementing the cycle counter with each clock cycle of a clock while the cycle counter is activated;

storing a threshold value in a monitor mode control register;

setting variable and decreasing threshold values in said monitor mode control register;

deactivating said cycle counter when a data completion signal is received from said memory hierarchy;

comparing a count value accumulated by the cycle counter to the threshold value stored in said monitor mode control register when the cycle counter is deactivated by a data completion signal;

incrementing an event counter when the count value accumulated by the cycle counter is greater than said threshold value;

accumulating counts from said event counter of memory accesses for said at least one level of cache and main memory that exceed decreasing threshold values set in said monitor mode control register; and generating an output for performance analysis, said output including a histogram of access time distributions of memory requests for each of said one level of cache and said main memory.

7. The method of determining a memory access distribution as a function of elapsed clock cycles recited in claim 6, wherein the activating step commences when one of a data load instruction and a data store instruction is received in the memory hierarchy.

8. The method of determining a memory access distribution as a function of elapsed clock cycles recited in claim 6, wherein the deactivating step occurs when data associated with the memory request signal is received from the memory hierarchy.

9. The method of determining a memory access distribution as a function of elapsed clock cycles recited in claim 6, wherein the deactivating step occurs when data associated with the memory request signal is stored in the memory hierarchy.

10. The method of determining a memory access distribution as a function of elapsed clock cycles recited in claim 6, wherein the clock cycles are selected from the group consisting of processor clock cycles and bus clock cycles.

* * * * *